US006702547B2

(12) United States Patent
Tiemann

(10) Patent No.: US 6,702,547 B2
(45) Date of Patent: Mar. 9, 2004

(54) GAS TURBINE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/120,806

(22) Filed: Apr. 11, 2002

(65) Prior Publication Data

US 2002/0150470 A1 Oct. 17, 2002

(30) Foreign Application Priority Data

Apr. 11, 2001 (EP) .............................. 01109036

(51) Int. Cl.[7] ............... F01D 9/06; F01D 5/18
(52) U.S. Cl. ............ 415/115; 415/116; 416/96 R
(58) Field of Search ................ 415/114, 115, 415/116; 416/96 R, 96 A, 97 R

(56) References Cited

U.S. PATENT DOCUMENTS

| 3,015,937 A | | 1/1962 | Giliberty |
| 3,291,447 A | | 12/1966 | Brandon |
| 4,721,433 A | | 1/1988 | Piendel et al. |
| 4,820,116 A | | 4/1989 | Hovan et al. |
| 5,525,032 A | * | 6/1996 | Kreis et al. ............... 415/115 |
| 5,782,076 A | * | 7/1998 | Huber et al. .............. 415/115 |
| 6,007,299 A | * | 12/1999 | Uematsu .................. 416/96 R |
| 6,019,573 A | * | 2/2000 | Uematsu et al. .......... 415/115 |
| 6,065,282 A | * | 5/2000 | Fukue et al. ............. 415/115 |

FOREIGN PATENT DOCUMENTS

| DE | 19629191 | 7/1996 |
| DE | 19824766 | 6/1998 |
| EP | 0933517 | 1/1998 |
| EP | 1052373 | 5/2000 |
| GB | 742477 | 10/1952 |
| JP | 11159345 | 11/1997 |

\* cited by examiner

*Primary Examiner*—Christopher Verdier

(57) ABSTRACT

In a gas turbine (1) having a number of rotor blades (12) in each case combined into rows of rotor blades and arranged on a turbine shaft (8), and having a number of stator blades (14) in each case combined into rows of stator blades and connected to a turbine casing, a particularly high efficiency is simply to be achieved with reliable cooling of the turbine blades (12), (14). For this purpose, at least some of the stator blades (14) have an inlet (48) for a cooling medium at their free end facing the turbine shaft (8).

6 Claims, 3 Drawing Sheets

GAS TURBINE

CROSS-REFERENCE TO RELATED APPLICATIONS

This application is based on and hereby claims priority to European Patent Application No. 01109036.2, filed Apr. 11, 2001, the contents of which are hereby incorporated by reference.

FIELD OF THE INVENTION

The invention relates to a gas turbine having a number of rotor blades in each case combined into rows of rotor blades and arranged on a turbine shaft, and having a number of stator blades in each case combined into rows of stator blades and connected to a turbine casing.

BACKGROUND OF THE INVENTION

Gas turbines are used in many areas to drive generators or working machines. Here, the energy content of a fuel is used to produce a rotational movement of a turbine shaft. To this end, the fuel is burned in a combustion chamber, compressed air being fed in from an air compressor. The working medium produced in the combustion chamber by the combustion of the fuel and under high pressure and at a high temperature is in this case guided via a turbine unit connected downstream of the combustion chamber, where it is expanded and produces power.

In order to produce the rotational movement of the turbine shaft, in this case a number of rotor blades usually combined into groups of blades or rows of blades are arranged on said turbine shaft, and drive the turbine shaft via a transfer of momentum from the working medium. In order to guide the working medium in the turbine unit, rows of stator blades connected to the turbine housing are additionally normally arranged between adjacent rows of rotor blades.

In the design of gas turbines of this type, in addition to the achievable output, a particularly high efficiency is usually a design objective. On thermodynamic grounds, an increase in the efficiency can in principle be achieved by increasing the outlet temperature at which the working medium flows out of the combustion chamber and into the turbine unit. Therefore, temperatures of about 1200° C. to 1300° C. are aimed at for such gas turbines and are also achieved.

At such high temperatures of the working medium, however, the components exposed to the latter are subjected to high thermal stresses. In order nevertheless, with high reliability, to ensure a comparatively long life time of the components involved, cooling of the components involved, in particular of rotor blades and/or stator blades in the turbine unit, is usually provided. The turbine blades are therefore normally designed such that they can be cooled, the intention being in particular to ensure effective and reliable cooling of the first rows of blades as viewed in the flow direction of the working medium. For the purpose of cooling, the respective turbine blade in this case normally has a coolant duct integrated into the leaf of the blade or the profile of the blade, from which duct a coolant can specifically be fed in, in particular to the thermally stressed zones of the turbine blades.

The coolant used in this case is normally cooling air. This is normally fed to the respective turbine blade via an integrated coolant duct, in the manner of open cooling. Starting from said coolant duct, the cooling air flows through the respectively provided areas of the turbine blade in branching ducts. On the outlet side, these ducts are left open, so that after passing through the turbine blade, the cooling air emerges from the latter and in the process is mixed with the working medium guided in the turbine unit.

In this way, a reliable cooling system for the turbine blades can be provided with comparatively simple means, it being possible even for thermally particularly stressed zones of the turbine blades to be acted on with coolant in a suitable way. On the other hand, however, at the introduction of the cooling air into the working medium guided in the turbine unit, care must be taken that its characteristic parameters, such as pressure and temperature, can be combined with or are compatible with the corresponding parameters of the working medium. In particular, the permissible heating of the cooling air during the cooling of the turbine blades is only limited, so that precisely in the case of comparatively high intended outlet temperatures of the working medium, a particularly large quantity of cooling air is required. This in turn has a limiting effect on the efficiency of the gas turbine.

SUMMARY OF THE INVENTION

The invention is therefore based on the object of specifying a gas turbine of the type mentioned above in which, with reliable cooling of the turbine blades with simple means, a particularly high efficiency can be reached.

According to the invention, this object is achieved in that at least some of the stator blades have an inlet for a cooling medium at their free end facing the turbine shaft.

In this case, the invention is based on the consideration that the gas turbine should be designed for a particularly high efficiency in such a way that reliable cooling of the turbine blades can be carried out with only a low quantity of cooling medium. For this purpose, the cooling of the turbine blades should be carried out in the manner of closed cooling, in which, after flowing through the turbine blade to be cooled, the cooling medium is not mixed with the working medium flowing in the turbine unit but, instead, is led away in a controlled manner and supplied to another use. This is because, in such a cooling concept, no adaptation to the working medium of the operating parameters of the cooling medium flowing away out of the turbine blades is required.

In order to keep particularly low the production and development expenditure for a gas turbine having cooled turbine blades closed in this way, the design should to a large extent follow the design of a gas turbine with open cooling of the turbine blades. The flow paths of the cooling medium in the gas turbine should approximate as far as possible to the flow paths of the cooling medium with open cooling even in the case of closed cooling. This can be achieved in a particularly simple way by the feeding of the rotor blades with cooling air via the turbine shaft and the blade root being maintained but the discharge of the cooling medium from the respective rotor blade being carried out in the manner of closed cooling, likewise through the blade root and into the turbine shaft. From there, the further discharge of the cooling medium is provided via a stator blade adjacent to the respective rotor blades, as viewed in the flow direction of the working medium. To this end, the respective stator blade has an inlet for the cooling medium at its free end facing the turbine shaft. During operation, the respective stator blade therefore has cooling medium flowing through it from its free end in the direction of its blade root in the manner of "countercurrent" flow.

For a particularly beneficial saving effect with regard to the cooling medium needed, and therefore for a particularly high contribution to the increase in efficiency, such closed cooling is expediently provided for the first row of rotor blades, as viewed in the flow direction of the working medium. For this purpose, in an advantageous refinement, those stator blades which form the row of stator blades connected downstream of this row of rotor blades, as viewed in the flow direction of the working medium, have an inlet for the cooling medium at their free end.

On account of the envisaged flow direction of the cooling medium through the respective stator blades, the cooling medium flows out of the respective stator blades into an area of the turbine casing. The cooling medium can therefore be guided away particularly simply in a controlled manner. Accordingly, a gas turbine is in principle suitable both for the use of cooling vapor and also for the use of cooling air as the cooling medium. In this case, cooling air is advantageously provided as cooling medium. On the outlet side, said cooling air can be guided in an area of the front hook of the stator blade and, from there, can be supplied to the combustion again through holes in the stator blade carrier.

In order to provide closed cooling for the rotor blades forming the first row of rotor blades, as viewed in the flow direction of the working medium, in an advantageous development these rotor blades respectively have an integrated coolant duct, whose inlet and outlet is in each case arranged on the turbine shaft. A meander is in each case provided within the respective rotor blade as a flow path for the cooling medium. After flowing away out of the respective rotor blade, the flow path of the cooling medium proceeds radially outward through the stator blade respectively connected downstream. In such a configuration, both for the rotor blades and for the stator blades, a supply of cooling medium is carried out on their side respectively facing the turbine shaft. The cooling medium therefore flows into the respective rotor or stator blade in the comparatively hottest area, so that a particularly beneficial cooling action is achieved.

In a further advantageous refinement, the outflows of the coolant ducts of the respective rotor blades communicate with an antechamber which is integrated into the turbine shaft and which, in turn, on the outlet side is connected respectively to a coolant inlet of each of the stator blades belonging to the following row of stator blades, as viewed in the flow direction of the working medium.

In order to ensure particularly reliable flow of the cooling medium both through the respective rotor blades and through the stator blades in each case connected downstream on the coolant side, in a further advantageous refinement a compressor is connected into the flow path of the cooling medium, before its entry into the coolant ducts. Said compressor is expediently defined for a pressure increase in the cooling medium of about 0.5 to 1 bar. Here, the compressor can be configured as an axial compressor or else as a radial compressor. In the case of a configuration as a radial compressor, the pressure increase in the cooling medium can be achieved by means of an appropriately selected radial height of the holes in the rotating turbine shaft, use being made of the centrifugal force of the rotating turbine shaft to increase the pressure.

The advantages achieved by the invention consist in particular in the fact that, by means of the stator blades provided with an inlet for the cooling medium at their free end facing the turbine shaft and therefore flowed through radially from the turbine shaft outward toward the turbine casing, closed cooling of rotor blades is made possible in a manner particularly closely following existing open cooling concepts. Here, the flow path of the cooling medium in this closed cooling is kept particularly short, so that the pressure losses which occur are kept particularly low. Therefore, in a particularly simple way, closed cooling for the respective rotor blades can be achieved, in addition the cooling medium finally flowing out of the respective stator blades arising in the area of the turbine casing and therefore in a fixed location. Disposal of the cooling medium is therefore made possible in a particularly simple way.

BRIEF DESCRIPTION OF THE DRAWINGS

An exemplary embodiment of the invention will be explained in more detail using a drawing, in which.

In all the figures, identical parts are provided with the same reference symbols.

DETAILED DESCRIPTION

Figure 1:
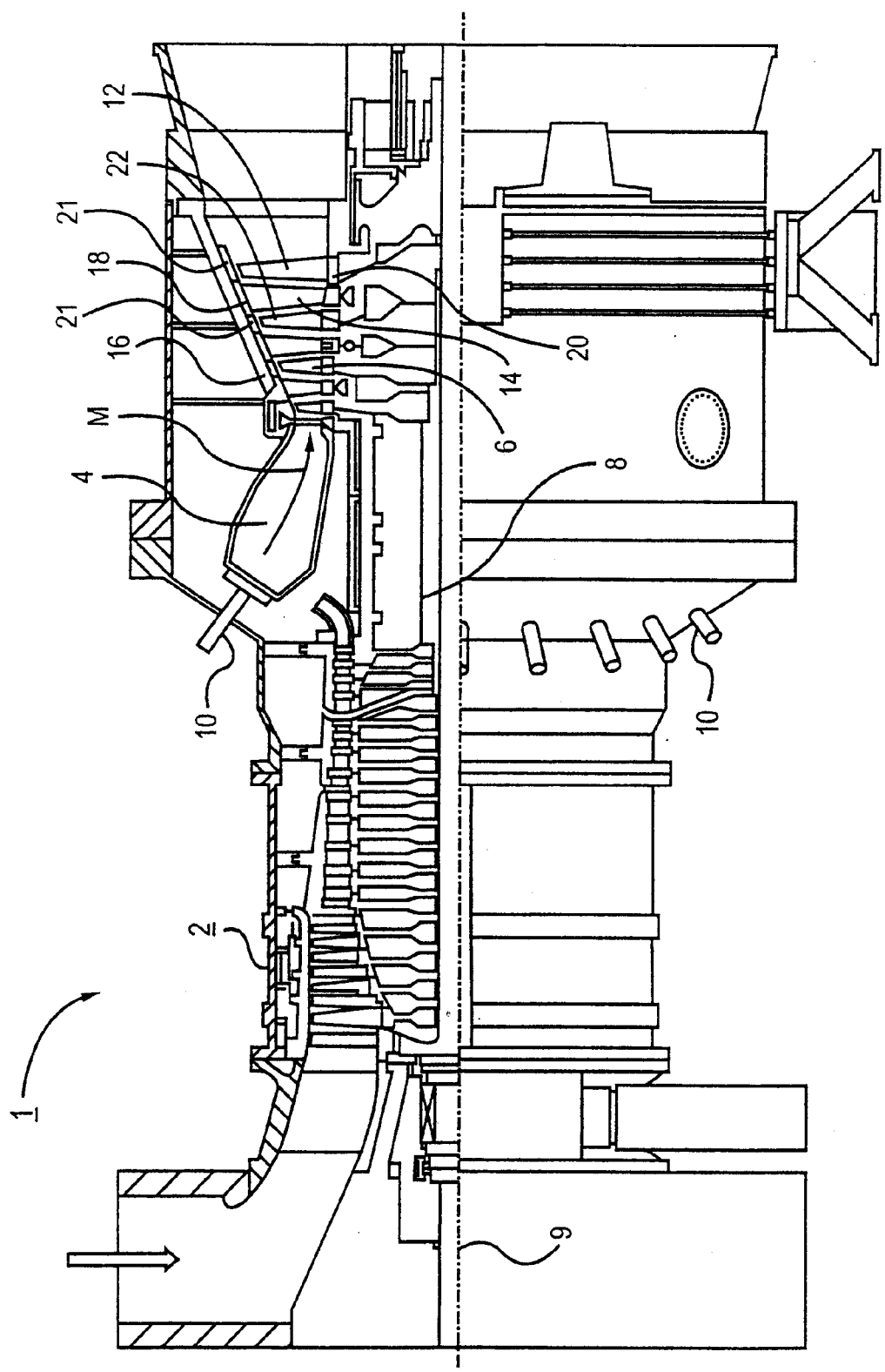
FIG. 1 shows a half section through a gas turbine.

The gas turbine 1 according to FIG. 1 has a compressor 2 for combustion air, a combustion chamber 4 and a turbine 6 to drive the compressor 2 and, not illustrated, a generator or a working machine. For this purpose, the turbine 6 and the compressor 2 are arranged on a common turbine shaft 8, also referred to as a turbine rotor, to which the generator or the working machine is also connected, and which is mounted such that it can rotate about its mid-axis 9.

The combustion chamber 4 is equipped with a number of burners 10 for burning a liquid or gaseous fuel. In addition, it is provided with heat shield elements, not specifically illustrated, on its inner wall.

The turbine 6 has a number of rotatable rotor blades 12 connected to the turbine shaft 8. The rotor blades 12 are arranged in the form of a ring on the turbine shaft 8 and thus form a number of rows of rotor blades. Furthermore, the turbine 6 comprises a number of stationary stator blades 14, which are fixed to an inner casing 16 of the turbine 6, likewise in the form of a ring and forming rows of stator blades. Here, the rotor blades 12 serve to drive the turbine shaft 8 by means of the transfer of momentum from the working medium M flowing through the turbine 6. In contrast, the stator blades 14 serve to guide the flow of the working medium M between in each case two successive rows of rotor blades or rings of rotor blades, as viewed in the flow direction of the working medium M. A successive pair comprising a ring of stator blades 14 or a row of stator blades and a ring of rotor blades 12 or a row of rotor blades is in this case also referred to as a turbine stage.

Each stator blade 14 has a platform 18, also referred to as a blade root, which is arranged as a wall element on the inner casing 16 of the turbine 6 in order to fix the respective stator blade 14. Here, the platform 18 is a component which is comparatively highly stressed thermally and which forms the outer boundary of a hot-gas duct for the working medium M flowing through the turbine 6. In an analogous way, each rotor blade 12 is fixed to the turbine shaft 8 via a platform 20, also referred to as a blade root.

Between the platforms 18, arranged at a distance from one another, of the stator blades 14 of two adjacent rows of stator blades, in each case a guide ring 21 is arranged on the inner casing 16 of the turbine 6. The outer surface of each guide ring 19 is likewise subjected to the hot working medium M flowing through the turbine 6 and, in the radial direction, is spaced apart by a gap from the outer end 22 of the rotor blade 12 located opposite it. The guide rings 19 arranged between adjacent rows of stator blades are used in particular as covering elements which protect the inner wall 16 or other internal casing fittings from thermal overloading by the hot working medium M flowing through the turbine 6.

Figure 2:
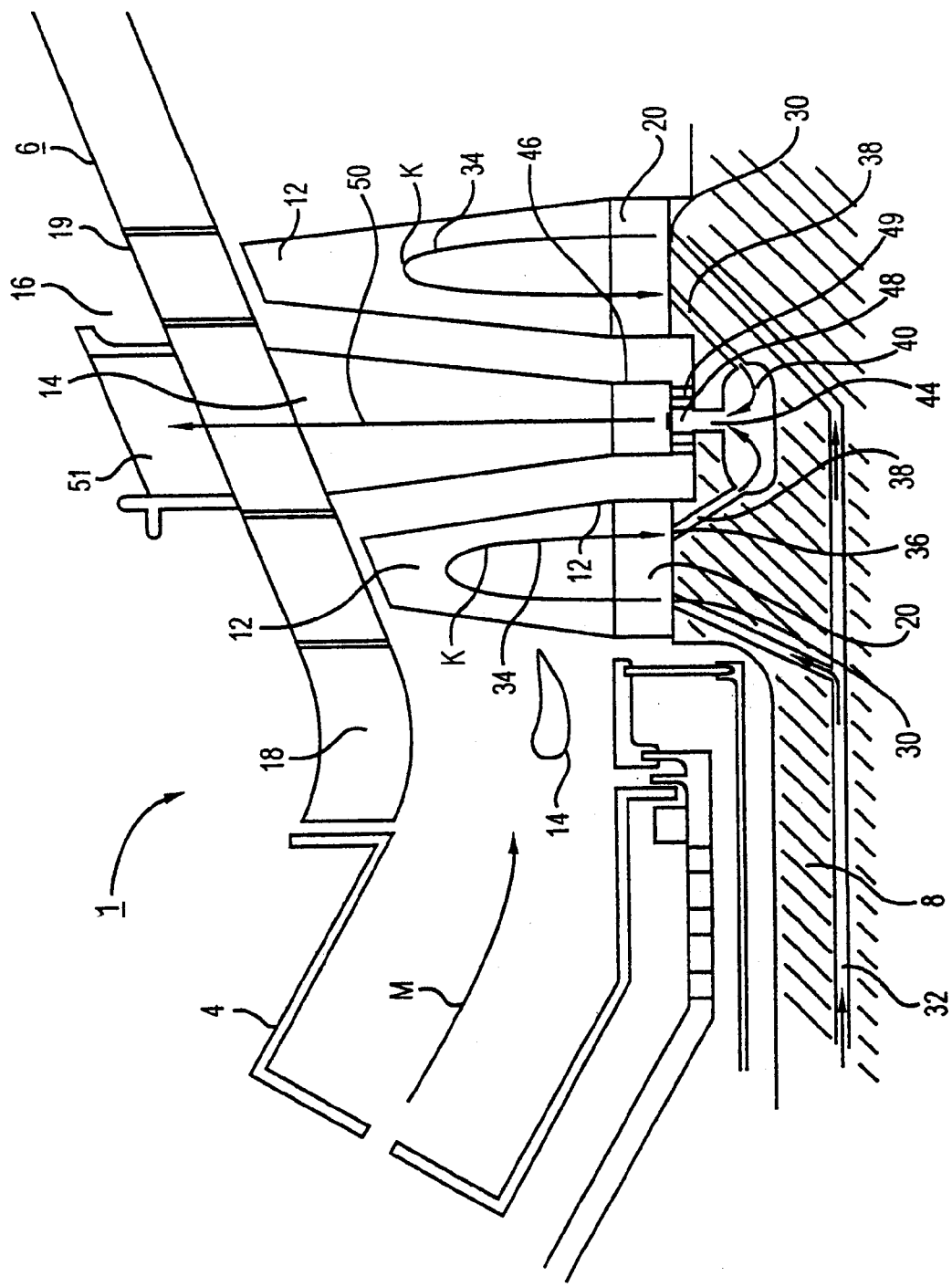
FIG. 2 shows a detail from a longitudinal section of the gas turbine according to FIG. 1, with the representation of cooling ducts.

In order to achieve a comparatively high efficiency, the gas turbine 1 is designed for a comparatively high outlet temperature of about 1200° C. to 1300° C. of the working medium M emerging from the combustion chamber 4. In order to make this possible, at least some of the rotor blades 12 and the stator blades 14 are designed such that they can be cooled by cooling air as cooling medium. In order to illustrate the flow path of the cooling air, the area of the gas turbine 1 directly following the combustion chamber 4 is illustrated in enlarged form in detail in FIG. 2. It can be seen here that the working medium M flowing out of the combustion chamber 4 first strikes a number of stator blades 14, which form the first row of stator blades, as it is known, and are hooked into the combustion chamber 4 via their respective platform 18. As viewed in the flow direction of the working medium M, there then follow the rotor blades 12 forming the first row of rotor blades, the stator blades 14 forming the second row of stator blades, and the rotor blades 12 forming the second row of rotor blades.

In order to make a particularly high efficiency of the gas turbine 1 possible, at least the rotor blades 12 forming the first row of rotor blades and the second row of rotor blades are designed for closed air cooling, that is to say for a controlled discharge of "used" cooling air K. For this purpose, each of the rotor blades 12 forming the first and the second rows of rotor blades have in each case an inlet 30 for cooling air K as cooling medium in their platform 20 forming their blade root. In this case, the inlet 30 is in each case connected to an integrated duct system 32 guided in the turbine shaft 8, via which the respective inlet 30 can be fed with cooling air K. Arranged within the respective rotor blade 12 is a coolant duct (not specifically illustrated), in particular in the form of a meander, which is connected to the inlet 30. In order to form a flow path for the cooling air K, in each case indicated by the arrow 34, the coolant duct is in this case guided in a meandering form, in such a way that all the physical areas of the respective rotor blades 12 can be cooled adequately. The respective coolant duct in this case opens on the outlet side in an outlet 36 likewise arranged in the area of the platform 20 and of the turbine shaft 8.

The outlets 36 of the rotor blades 12 communicate, via a respectively associated outflow channel 38, with a common antechamber 40 which is integrated into the turbine shaft 8 and into which the cooling air K flowing out of the rotor blades 12 passes. The antechamber 40 has a number of coolant outlets 44, each of which is respectively assigned to a stator blade 14. For this purpose, each coolant outlet 44 is arranged physically opposite the end piece 46 of the respective stator blade 14. Here, the corresponding stator blade 14 has, at its end or on its end piece 46, an inlet 48 for cooling air K as a cooling medium, facing the respective coolant outlet 44. Toward the outside, that is to say with respect to the flow chamber of the working medium M within the turbine 6, the flow connection formed by the coolant outlet 44 and the inlet 48 is sealed off by means of a lamellar seal 49.

The inlet 48 is connected to a coolant duct which is guided in the respective stator blade 14 but not specifically illustrated, via which the cooling air K flowing into the stator blade 14 via the inlet 48 flows substantially radially away from the turbine shaft 8 toward the inner wall 16 of the turbine 6. This part of the flow path is symbolized by the arrow 50. On the output side, the coolant duct is connected to a waste-air chamber 51 integrated into the inner wall 16 of the turbine casing from which "used" cooling medium can be supplied to a further use or to disposal.

In summary, therefore, the following results as the flow path for the cooling air K: the cooling air K is fed in via the duct system 32 and passes from there to the inlet 30 of the respective rotor blade 12. From there, the cooling air K flows through the respective rotor blade 12 in a substantially meandering fashion and passes to the outlet 36 in the area of the turbine shaft 8. Within the turbine shaft 8, the cooling air K then flows into the antechamber 40 where it passes to the inlet 48 of the respective stator blade 14. The cooling air K then flows through the stator blade 14 radially from the inside to the outside. After flowing out of the stator blade 14, the "used" cooling air K passes into the waste-air chamber 51.

On account of the resulting comparatively short flow path, the pressure losses of the cooling air K are comparatively low, in spite of the closed cooling. In order to maintain reliable flow of the cooling air K with certainty, a pressure increase of about 0.5 to 1 bar is provided before the cooling air K flows into the inlet 30 of the respective rotor blade 12. For this purpose, the duct system 32 is provided with a compressor. In this case, the compressor can be designed as an axial compressor. In the exemplary embodiment, however, a radial compressor is provided as compressor, the pressure increase being ensured by means of the radial arrangement of the inlet 30 with regard to the turbine shaft 8. In particular, to this end each inlet 30, as viewed in the radial direction, is further removed from the mid-axis 9 of the turbine shaft 8 than the antechamber 40. When the turbine shaft 8 is rotating, the resulting centrifugal force therefore leads to an increase in the pressure of the cooling air K at the respective inlet 30 in order to overcome the pressure losses within the respective rotor blade 12.

Figure 3:
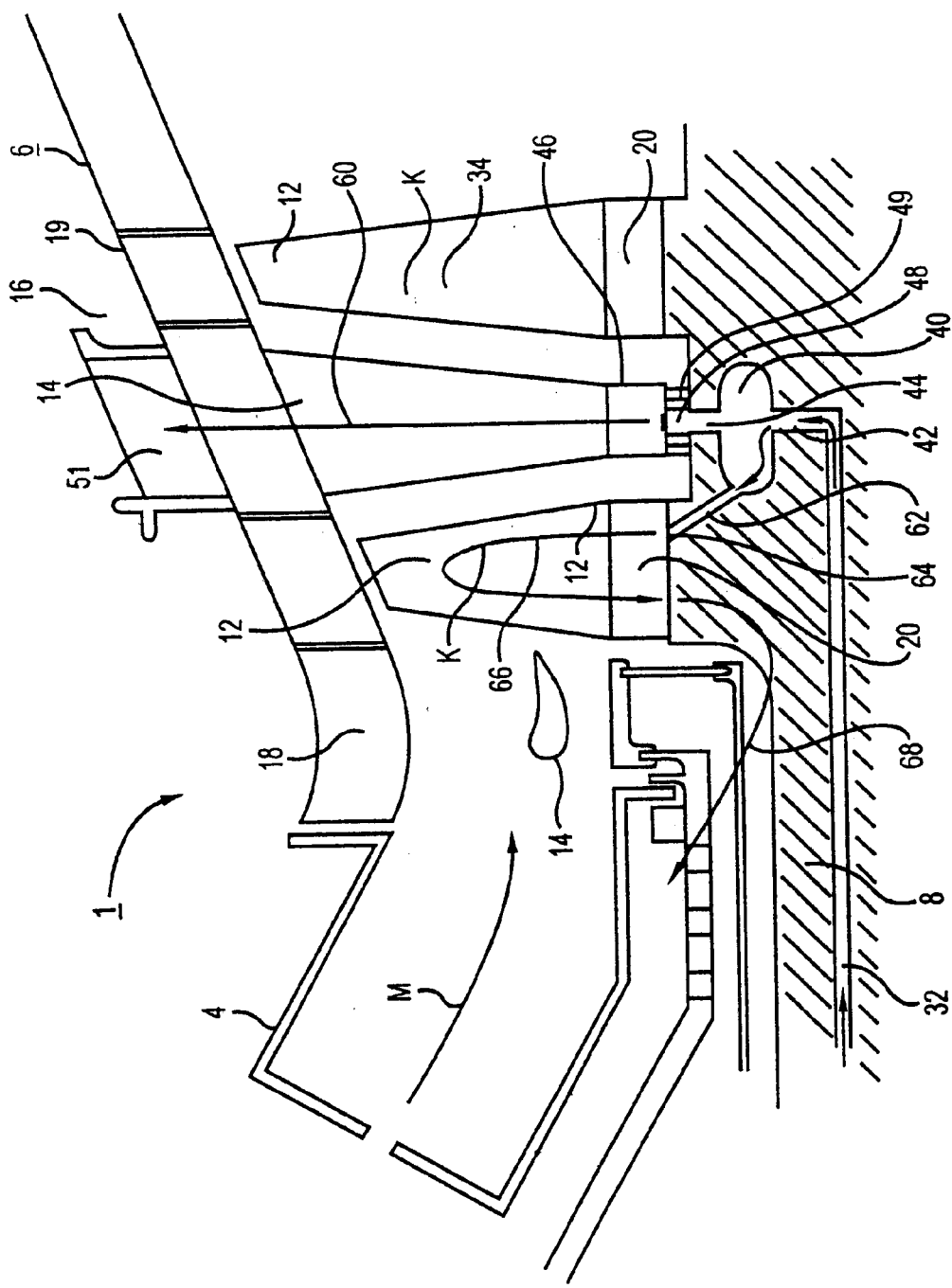
FIG. 3 shows a detail as in FIG. 2 with an alternative connection of the cooling ducts.

Alternative flow guidance for the cooling air K, while maintaining the other components, is shown in FIG. 3. In this design, which may be beneficial, for example because of deviations in the boundary conditions such as the quantity of the cooling air K provided as a whole, the antechamber 40 is fed with cooling air K directly via the duct system 32. From there, in the manner of a parallel discharge of part streams of the cooling air K firstly cooling air K is applied to the stator blades 14 via the inlet 48, as symbolized by the arrow 60. In this case, the cooling air K therefore passes into the stator blades 14 "unused" and as fresh air.

In parallel with this, in this case the rotor blade 12 is also fed from the antechamber 40 via a part duct 62, which is connected to a coolant inlet 64 of the rotor blade 12. From there, the part flow of the cooling air K flows through the rotor blade 12, as symbolized by the arrow 66. Then, as symbolized by the arrow 68, the cooling air K, which is now "used", in this part-flow branch is suitably guided away.

What is claimed is:

1. A gas turbine, comprising;
    a number of rotor blades in each case combined into rows of rotor blades and arranged on a turbine shaft;
    a number of stator blades in each case combined into rows of stator blades and connected to a turbine casing, of which at least some have an inlet for a cooling medium, at their free end facing the turbine shaft, and in which those stator blades that form the row of stator blades connected downstream of the first row of stator blades, as viewed in a flow direction of a working medium, have an inlet for the cooling medium at their free end; and wherein the rotor blades forming the first row of rotor blades, as viewed in the flow direction of the working medium, each have an integrated cooling duct, whose inlet and outlet is in each case arranged on the turbine shaft, wherein the outlets of the coolant ducts of the respective rotor blades communicate with an antechamber which is integrated into the turbine shaft and which in turn on the outlet side is respectively connected to an inlet, for cooling medium for each stator blade associated with the row of stator blades, as viewed in the flow direction of the working medium.

2. The gas turbine of claim 1, wherein air is provided as the cooling medium.

3. The gas turbine of claim 2, wherein a compressor is connected into the flow path of the cooling medium, before its entry into the coolant ducts.

4. The gas turbine of claim 1, wherein the cooling medium is provided by at least one rotor blade.

5. The gas turbine of claim 1, wherein the cooling medium is controlled discharged at an outlet side of the stator blades.

6. A gas turbine, comprising:

a number of rotor blades in each case combined into rows of rotor blades and arranged on a turbine shaft;

a number of stator blades in each case combined into rows of stator blades and connected to a turbine casing, of which at least some have an inlet for a cooling medium at their free end facing the turbine shaft; and wherein the rotor blades forming the first row of rotor blades, as viewed in a flow direction of working medium, each have an integrated cooling duct, whose inlet and outlet is in each case arranged on the turbine shaft, wherein the outlets of the coolant ducts of the respective rotor blades communicate with an antechamber which is integrated into the turbine shaft and which in turn on the outlet side is respectively connected to an inlet, for cooling medium for each stator blade associated with the row of stator blades, as viewed in the flow direction of the working medium.

* * * * *